United States Patent [19]

Kantor et al.

[11] Patent Number: 5,157,103

[45] Date of Patent: Oct. 20, 1992

[54] COPOLYMER OF LIQUID CRYSTAL TRIAD AROMATIC ESTER MESOGENIC UNIT WITH FLEXIBLE SPACER AND POLYESTER

[75] Inventors: Simon W. Kantor, Agawam; Robert W. Lenz, Amherst, both of Mass.; William J. Ward, Lisle, Ill.

[73] Assignee: University of Massachusetts at Amherst, Amherst, Mass.

[21] Appl. No.: 647,894

[22] Filed: Jan. 30, 1991

[51] Int. Cl.$^5$ .............. C08G 63/00; C08G 67/00; C08G 69/00; C08G 63/02
[52] U.S. Cl. ................................ 528/272; 528/271
[58] Field of Search .................. 528/176, 271, 272

[56] References Cited

FOREIGN PATENT DOCUMENTS 63-317524  6/1987  Japan .

OTHER PUBLICATIONS

*Polymer Engineering and Science*, p. 13, Boo Young Shin et al., vol. 30, No. 1, 1990.
*Polymer Journal*, pp. 9-17, C. Ober et al., vol. 14, No. 1 (1982).

Primary Examiner—John Kight, III
Assistant Examiner—T. Mosley
Attorney, Agent, or Firm—Richard P. Fennelly; Louis A. Morris

[57] ABSTRACT

A copolymer of (1) a triad aromatic ester mesogenic unit containing a flexible polyalkylene spacer in the main chain thereof and (2) a polyester is disclosed.

7 Claims, No Drawings

COPOLYMER OF LIQUID CRYSTAL TRIAD AROMATIC ESTER MESOGENIC UNIT WITH FLEXIBLE SPACER AND POLYESTER

BACKGROUND OF INVENTION

During the last several years a great deal of attention has been paid to composite materials. Composite formulation is a prime method of improving the matrix polymer's rheological properties. In particular, recent work has focused on using liquid crystal (LC) polymers as the reinforcing component in the composite. Thus, the preparation of blends of various LC polymer systems and semi-flexible thermoplastics has been attempted in the hope that the LC material will reinforce the thermoplastic on a molecular or supramolecular level. Molecular composites based on LC polymers would have several advantages over conventional macroscopic composites including: lower melt viscosities; increased homogeneity between phases; and less mechanical wear on processing equipment.

Two means for obtaining a LC molecular composite can be visualized. The first method involves simple blending of the LC component into the flexible matrix polymer. The second method deals with preparing copolymers comprised of rigid rod and flexible components, both by solution or by melt polymerization techniques. For example, Japanese Pat. Publ. No. 63/317,524 teaches formation of copolyesters by reacting an aliphatic diol with an aromatic dicarboxylic acid and an aromatic oxy acid.

A series of thermotropic LC polyesters comprising a rigid aromatic triad unit and a flexible methylene spacer were developed by Lenz et al., and are described in Polymer J., Vol. 14, p. 9 (1982). These materials have the repeat unit

where Ar is a phenyl ring and n is an integer of from 2-10, such as 4. The phenyl ring substituents are para. These materials are considered to be triad aromatic ester mesogenic units comprising a flexible polyalkylene spacer in the main chain thereof.

Recently, Shin et al. in Polym. Eng. Sci., Vol. 30 pp. 13-21 and 22-29 (1990) have explored blends of such a triad type polymer, containing a decamethylene spacer, with poly(ethylene terephthalate) (PET) and nylon 66, respectively. The results indicated an improvement in the strength and modulus of the matrix polymer. Good adhesion was also seen between the LC/matrix polymer phases.

SUMMARY OF THE INVENTION

The present research invention is directed to copolymers, rather than blends, based on such triad polymers with a polyester such as either poly(butylene terephthalate) (PBT) or poly(ethylene terephthalate) (PET). It is deemed that these new copolymers are useful candidates for the preparation of molecular composite blends using such a polyester as the matrix polymer. LC copolymers which contain portions of the matrix polymer in the backbone should increase the phase miscibility of the blend. Furthermore, by adjusting the relative ratio of flexible moieties in the LC copolymer, the overall melting point of the material can be tailored to fit various blend processing temperature requirements.

DETAILED DESCRIPTION OF INVENTION

The present invention relates to the preparation of the aforementioned types of copolymers based on the aromatic triad polymer described above, where r=4, and with either polyester PBT or PET monomer units. The polyester most preferred is from the poly(alkylene terephthalate) class. Three copolymers (B, C, and D) comprised of a triad segment (x), and a PBT segment (y), for example, can be prepared from the condensation reaction of terephthaloyl chloride and an equivalent amount of a variable molar ratio of monomer (1), (Polymer J., 14, 9 (1982), and bis(4-hydroxybutyl) terephthalate (2a), (Makromol. Chem. 181, 301 (1980) and Polymer, 27 1111 (1986)). The following are depictions for monomers (1) and (2), with Ar being as defined above, with the (reactive) substituents on the phenyl ring being para, and with the polyalkylene spacer being as shown by "n" below:

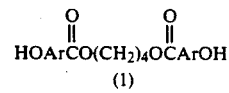
(1)

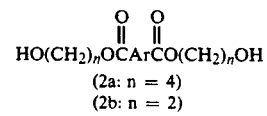
(2a: n = 4)
(2b: n = 2)

The final copolymer, in a preferred embodiment contemplated herein, has the structure shown below, with x and y indicating molar amounts and preferably ranging from about 10:90 to about 90:10, inclusive:

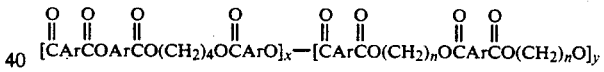

(B: n = 4; x/y = 66/33)
(C: n = 4; x/y = 50/50)
(D: n = 4; x/y = 20/80)
(E: n = 2; x/y = 50/50)

The present invention is further understood by the Examples which follow.

GENERAL METHOD FOR THE PREPARATION OF COPOLYMERS

The appropriate diol monomers were combined with an equivalent amount of terephthaloyl chloride in a Schlenk tube fitted with an argon inlet-outlet, reflux condenser and a magnetic stirring bar. The solids were mixed and 1-chloronaphthalene solvent (see Makromol. Chem., 186, 1575 (1985)) was admitted to the reaction vessel The reaction vessel was then placed into a hot salt bath at 180° C. Within a short period of time, HCl gas evolution was observed. After a half hour, a slow steady stream of argon was passed through the reaction vessel, and the reaction was heated and stirred for the appropriate time (until HCl was no longer detected in the gas stream, or the solution became too viscous to stir). When the reaction period had elapsed, the reaction tube was removed from the heat source and was cooled. The product was then mixed with a large quantity of methanol, and the suspension was stirred vigorously. The polymer was then collected by filtration and was

EXAMPLE 1

This Example shows the preparation of triad/PBT copolymer (B).

Polymer (B) was prepared using the general method described above. Thus, 2.0134 gm (6.095 mmole, 66%) of monomer (1) and 0.9460 gm (3.048 mmole, 33%) of bis(4-hydroxybutyl) terephthalate (2a) was reacted with 1.8562 gm of terephthaloyl chloride in 15 ml of 1-chloronaphthalene. The initial reaction temperature was 185° C., and was increased to 210° C. after twenty-four hours and held at this temperature for an additional eight hours, giving 3.70 gm (90%) of the copolymer: $\eta_{inh}=0.87$ dL/gm (p-chlorophenol/1,1,2,2-tetrachloroethane 50/50, 30° C., 0.5 gm/dL).

Anal calc. for $C_{25.33}H_{21.33}O_8$: C, 67.05; H, 4.74. Found: C, 67.36; H, 4.62.

Copolyester (B) was prepared from a 66/33 molar ratio of monomers (1), and (2a), respectively. Thermal analysis showed a broad melting transition at 238° C. An isotropization peak was not observed. However, this material proved to be liquid crystalline. The second cooling cycle exhibited a very small exotherm at 305° C., and a crystallization peak at 155° C. In the melt phase, polymer (B) displayed a thread-like or marbled texture under a polarizing optical microscope (POM).

EXAMPLE 2

This Example shows the preparation of triad/PBT copolymer (C).

Polymer (C) was prepared using the general method described above. Thus, 3.000 gm (9.08 mmole, 50%) of monomer (1) and 2.819 gm (9.08 mmole, 50%) of bis(4-hydroxybutyl) terephthalate (2a) was reacted with 3.689 gm of terephthaloyl chloride in 20 ml of 1-chloronaphthalene. The reaction temperature was held at 195° C. for thirty-six hours, giving 3.70 gm (90%) of the copolymer: $\eta_{inh}=1.01$ dL/gm (p-chlorophenol/1,1,2,2-tetrachloroethane 50/50, 30° C., 0.5 gm/dL).

Anal. calc. for $C_{50}H_{44}O_{16}$: C, 66.66; H, 4.92. Found: C, 66.53; H, 4.85.

Copolyester (C) was prepared from a 50/50 molar ratio of (1) and (2a). This material also proved to be liquid crystalline. Two overlapping endothermic peaks were observed in the DSC. The melt-flow temperature occurred at 219° C. A single exothermic peak was observed on cooling at 186° C. A marbled texture, along with a Schlieren texture could be observed under a POM. When the sample was heated to high temperatures or annealed at temperatures just above the melting point, phase separation behavior was observed. When the sample was cooled the dark isotropic phase areas became birefringent, and exhibited a tight thread-like texture (the same type of behavior occurred in polymer (B), but to a lesser extent). The LC phase began to clear at 315° C., however, this transition was not indicated in the DSC thermogram.

EXAMPLE 3

This Example shows the preparation of triad/PBT copolymer (D).

Polymer (D) was prepared using the general method described above. Thus, 1.064 gm (3.22 mmole, 20%) of monomer (1) and 3.999 gm (12.9 mmole, 80%) of bis(4-hydroxybutyl) terephthalate (2a) was reacted with 3.270 gm of terephthaloyl chloride in 20 ml of 1-chloronaphthalene. The reaction temperature was held at 185° C. for thirty hours, giving 6.60 gm (92%) of the copolymer.

Anal. calc. for $C_{24.4}H_{23.2}O_8$: C, 65.94; H, 5.26. Found: C, 66.05; H, 5.20.

Polymer (D), which was synthesized from a 20/80 molar ratio of (1) and (2a), respectively, and which is composed mostly of PBT, did not exhibit LC behavior This result was not unexpected. Thermal analysis of this polymer gave rise to two closely spaced endothermic peaks at 203° C., and 214° C. in the heating cycle. A single exotherm was noted in the cooling cycle at 174° C. Annealing the sample at various temperatures between the two endotherms produced unidentifiable textures under the microscope, however the sample was quite cloudy and very difficult to shear. Isotropization occurred upon melting. Therefore, it is believed that the endothermic peaks in the DSC correspond to either a crystal-crystal, or a premelting for the low temperature peak, and a melting transition for the high temperature peak.

EXAMPLE 4

This Example shows the preparation of triad/PET copolymer (E).

Polymer (E) was prepared using the general method described above. Thus, 1.222 gm (3.70 mmole, 50%) of monomer (1) and 0.940 gm (3.70 mmole, 50%) of bis(2-hydroxyethyl) terephthalate (2b) was reacted with 1.501 gm of terephthaloyl chloride in 20 ml of 1-chloronaphthalene. The initial reaction temperature was 220° C., and was decreased to 190° C. after two hours and held at this temperature for an additional seventy hours, giving 2.5 gm (92%) of the copolymer.

Anal calc. for $C_{46}H_{36}O_{16}$: C, 65.40; H, 4.30. Found: C, 65.31; H, 4.22.

The PET analog, (E), of polymer (C) was also prepared in a similar fashion. In this case bis(2-hydroxyethyl) terephthalate (2b), was utilized instead of monomer (2a). This new copolymer was also liquid crystalline. A complex thermogram was evident in the DSC. The endotherm, which peaked at 235° C., corresponded to the melt-flow temperature. The recrystallization peak occurred at 193° C. On a POM, a melted sample of (E) gave a mosaic texture. Just as the PBT based copolymer (C), this PET-based copolymer also phase separated into LC and isotropic domains upon heating. When the sample temperature was increased, the LC domains became smaller, with complete isotropization occurring at around 300° C. Again, isotropization was not readily discernible in the DSC, because the clearing seems to take place over a broad temperature range. The dark phase areas became birefringent when the sample was cooled near the recrystallization temperature. The PET copolymer seemed to give phase separation more readily than the PBT analog.

As expected, when the random coil/LC ratio of the above mentioned copolyesters is increased, films prepared from the melt state became increasingly more flexible than the pure triad polymer. Furthermore, the melting points of the copolymers decrease as the amount of flexible component increases, relative to the pure triad polymer (m.p.=285° C.)

It is important to note that in preparing these copolymers, the reaction rate seems to be greater (rate of HCl gas evolution is faster) as the relative amount of the aliphatic diol reactant increases. This result can be explained by the fact that primary aliphatic alcohols react faster with acid chlorides than phenols do. Therefore, it is reasonable to assume that the synthesized copolymers may be somewhat 'blocky' in sequence distribution. This type of structure could play a large role in the observed phase separation behavior of these compounds.

The foregoing Examples are intended to merely illustrate certain embodiments of the instant invention and, for that reason, should not be construed in a limiting sense. The scope of protection sought is set forth in the claims which follow.

We claim:

1. A copolymer consisting essentially of both (a) triad aromatic ester mesogenic units having a flexible polyalkylene spacer in the main chain thereof and of the structure

where Ar is a phenyl ring and n is an integer of from 2 to 10; (b) and a poly(alkylene terephthalate) polyester.

2. A copolymer as claimed in claim 1 wherein the polyalkylene spacer is from about $C_2$ polyalkylene to about $C_{10}$ polyalkylene.

3. A copolymer as claimed in claim 1 wherein the polyester is poly(ethylene terephthalate).

4. A copolymer as claimed in claim 1 wherein the polyester is poly(butylene terephthalate).

5. A copolymer as claimed in claim 1 wherein the polyalkylene spacer is from $C_2$ to $C_{10}$ and the polyester is selected from the group consisting of poly(ethylene terephthalate) and poly(butylene terephthalate).

6. A copolymer as claimed in claim 1 wherein the polyalkylene spacer is $C_4$ and the polyester is poly(ethylene terephthalate).

7. A copolymer as claimed in claim 1 wherein the polyalkylene spacer is $C_4$ and the polyester is poly(butylene terephthalate).

* * * * *